April 29, 1958   A. L. RAWLINGS ET AL   2,832,191
ELECTRICALLY-DRIVEN TIMEPIECE
Filed Aug. 10, 1954   2 Sheets-Sheet 1

INVENTORS ARTHUR L. RAWLINGS
EDWIN F. SHELLEY
VLADIMIR VIASMENSKY
Kenyon & Kenyon
ATTORNEYS

INVENTORS
ARTHUR L. RAWLINGS
EDWIN F. SHELLEY
VLADIMIR VIASMENSKY

Kenyon & Kenyon

ATTORNEYS

United States Patent Office 2,832,191
Patented Apr. 29, 1958

2,832,191

ELECTRICALLY-DRIVEN TIMEPIECE

Arthur L. Rawlings, Jamaica, Edwin F. Shelley, New Rochelle, and Vladimir Viasmensky, Jackson Heights, N. Y.

Application August 10, 1954, Serial No. 448,891

7 Claims. (Cl. 58—41)

The present invention relates to electrically-driven horological instruments and more particularly to improvements in battery-operated watches wherein a battery is contained in a separate compartment within the watch casing and acts to energize an electromagnet driving device adapted to motivate the watch mechanism.

Electrically-driven watches heretofore known were generally constituted by a balance wheel caused to oscillate under the action of a hairspring, the oscillation being sustained by electromagnetically-generated impulses delivered to the balance at each period or half-period of its oscillatory motion. Motion to the watch hands was imparted by means of a train of gears driven by the balance through a ratchet or an equivalent device. In order to govern the repetition rate of impulses received from the electromagnetic driving device, the balance was adapted to open and close an electrical control switch once or twice in each oscillation.

The primary requirements for a time-keeping instrument are that its movement be accurate and reliable, and substantially independent of changes in the source of motive power. Known electrically-driven watches of the aforementioned type have proven to be inefficient both from the electrical and mechanical standpoint, and have failed, therefore, to receive commercial acceptance. Since the rate of oscillation of the balance is governed by the strength of the magnetic impulse delivered thereto, this strength attains its maximum value with a fresh battery but declines in the course of battery discharge. Hence, the rate of oscillation is linked to the charge condition of the battery, and accurate timekeeping cannot be maintained.

A further impairment in the capacity of the balance for accurate timekeeping results from the interference with the free motion of the balance by the drawing of mechanical power from the balance to drive the gear train. Moreover, the fact that the balance was also called upon to make and break an electrical contact, generally by flexing a spring device at frequent intervals, further reduced the accuracy of the movement. Inasmuch as a watch balance ordinarily undergoes two and a half complete oscillations per second, in hitherto-known watches of the above-described type, wherein the balance receives at least one magnetic impulse for each oscillation, this operation entails about 75 million impulses in the course of a year.

The source of electrical energy that can be stored in a wristwatch casing is obviously very small; hence, the amount that is available for each impulse is exceedingly minute. Accordingly, an electromagnetic device of very high impedance is required, and this necessitates electromagnetic windings with wire gauges of extreme fineness. Thus, the construction of such magnets is difficult and expensive.

In view of the foregoing, it is the principal object of the invention to provide an improved electrically-driven timekeeping instrument which is accurate and reliable, and is substantially independent of the charge condition of the electrical source.

More particularly, it is an object of the invention to provide a battery-operated watch in which the balance is free from extraneous mechanical interference, as in the case of a conventional spring-driven watch with a lever escapement. In accordance with one significant feature of the invention, a driving wheel in the watch train is electromagnetically actuated and the balance is relieved of the load of driving the train and the hands.

Another object of the invention is to provide a battery-operated electromagnet driving device for a watch movement, which device periodically supplies strong actuating impulses of brief duration to the movement at a relatively slow repetition rate, such that an interval of 10 to 15 or more seconds exists between said impulses. The invention makes possible the use of an electromagnet of low impedance and having a coil-winding wound of relatively large gauge wire.

It is yet another object of the invention to provide an electrical interrupter or switch for the electromagnet driving device, which switch is opened and closed by means having no direct connection with the balance wheel. In accordance with the invention, the electrical contacts are mounted on non-resilient supports and can be closed and held in engagement with a firm contact without substantial loss of mechanical energy.

Still another object of the invention is to provide an improved watch-casing for an electrically-driven timepiece, wherein the watch movement and the battery therefor are separately compartmentalized, whereby the mechanism of the watch is shielded from the battery.

Also an object of the invention is to provide an electrically-driven watch of efficient, accurate and sturdy design which may be inexpensively manufactured in a compact form and sold at reasonable cost.

For a better understanding of the invention, as well as other objects and further features thereof, reference is made to the following detailed description thereof, to be read in connection with the accompanying drawings wherein like components in the several views are identified by like reference numerals.

In the drawings.

*The watch mechanism*

Figure 1:
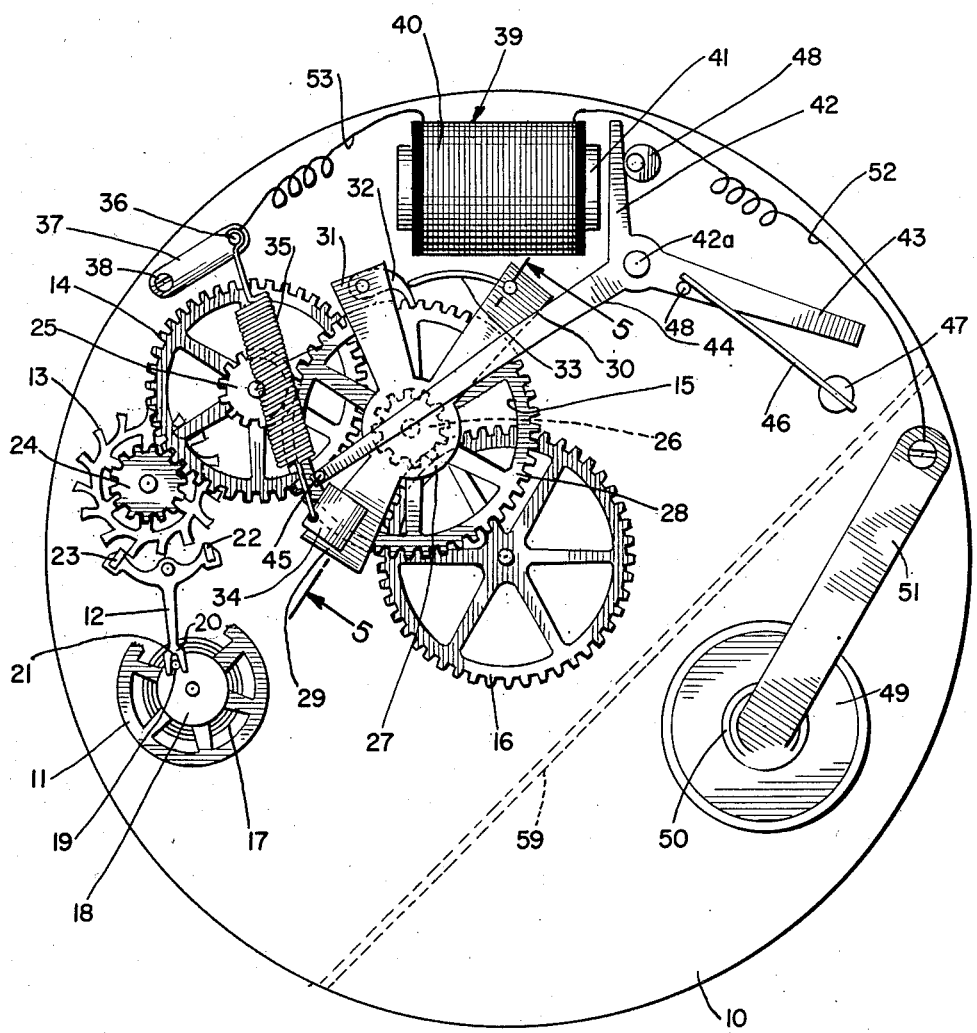
Fig. 1 is a bottom plan view of an electrically-driven watch in accordance with the invention.
Figure 5:
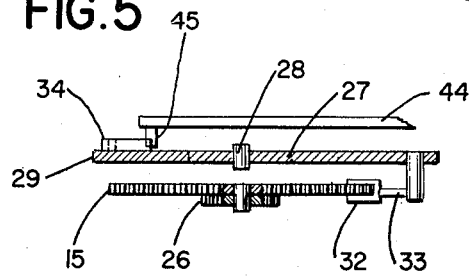
Fig. 5 is a sectional view taken along the plane 5—5 in Fig. 1.

Referring now to the drawings and more particularly to Figs. 1 and 5 which show a preferred embodiment of the invention, mounted on the disc-shaped frame 10 is a watch movement for driving the hands of the watch. For purposes of simplicity, only the train of the watch movement is illustrated. The watch train comprises a balance wheel 11, an escapement including a lever 12 and an escape wheel 13, an intermediate wheel 14, a driving wheel 15 and a minute wheel 16, these elements being conventional.

Balance wheel 11 is mounted for oscillation in jewel bearings in a conventional manner under the constraint of a hairspring 17, the balance being provided with a central disc 18 having an eccentric coupling pin 19. Lever 12 includes an extension 20 having an end notch 21 to receive the pin 19 of the balance wheel, and a yoke-shaped extension which bears on either arm the pallets 22 and 23. Pallets 22 and 23 of the escapement engage the teeth of escape wheel 13, said wheel being driven by a pinion 24 which meshes with the teeth of intermediate wheel 14. On the shaft of intermediate wheel 14 is a pinion 25 which intermeshes with driving wheel 15. Driving wheel 15 bears on its shaft a pinion 26 intermeshing with the teeth of minute wheel 16. The arrangement is such that pinion 26 drives minute wheel 16 at the rate of one revolution per hour and is coupled to the minute hand of the watch, the hour hand being driven by the usual motion work (not shown). The parts thus far described may be identical with those employed in a standard watch movement, save that the usual mainspring and barrel are omitted.

The gear train of the watch is maintained in rotation by applying a torque to driving wheel 15. This is accomplished by means of a tripartite or star-shaped driving element 27, which, as best seen in Fig. 5, is mounted for rotation about a central stud 28 concentrically disposed relative to the shaft of driving wheel 15. Stud 28 is carried by a bridge member, not shown. Driving element 27 is provided with three radially-extending wedge-shaped arms 29, 30 and 31. Arm 31 supports a pawl or click 32, adapted to engage the gear teeth of driving wheel 15. The click is urged into engagement with the teeth by means of a leaf spring 33, fixedly carried by arm 30. Rotation of driving element 27 in the clockwise direction causes wheel 15 to move in the same direction as the urging of pawl 32. Rotation of driving element 27 in the reverse or counterclockwise direction causes pawl 32 to step from notch to notch in the teeth of wheel 15.

The third arm 29 of the driving element 27 is fabricated of insulating material such as Bakelite, and has mounted on its extremity an electrical contact plate 34, preferably made of gold, platinum or any other material characterized by high conductivity and freedom from oxidation. A clockwise torque is applied to the driving element 27 by means of a helical spring 35, one end of which is hooked onto contact plate 34 and the other end of which is hooked onto a terminal post 36 supported on one end of an insulating strip 37. The other end of strip 37 is secured by an adjustable screw 38 to the frame 10 of the watch.

Spring 35 is made of steel, beryllium-copper or any other conductive metal having desirable resilient properties.

Strip 37 in conjunction with screw 38 affords a hinge mounting for the spring 35 and permits adjustment of the spring tension to the degree necessary to drive the escapement and impart proper motion to the balance wheel.

The actuating means for the driving element is constituted by an electromagnet 39, having a winding 40 surrounding a ferromagnetic core 41.

The electromagnet 39, when energized actuates an armature 42, pivoted by pin 42a and disposed in cooperative relation with core 41 to be attracted thereby. Armature 42 is provided with an integral Y-shaped extension constituted by branches 43 and 44. Branch 43 acts as a counterpoise for the armature so as to center the mass of the armature assembly approximately in the area of pivot pin 42a.

Branch 44 functions as the movable contact arm of a switch and carries at its extremity a downwardly-extending pin 45 formed of gold, silver or other suitable contact metal. Pin 45, in certain conditions to be later described, impinges on the edge of contact plate 34 on the driving element. A flat pull-off spring 46 secured in a pillar 47 acts against a pin 48 mounted on branch 43 and urges the armature 42 away from the magnet in the absence of magnet energization. Spring 46 is of conductive metal construction and acts also to ground the armature assembly to the frame 10. An adjustable eccentric stop 48 functions to limit the extent to which spring 46 can withdraw the armature from the core of the electromagnet.

The electrical circuit

Energization of electromagnet 39 is effected by means of a battery or wafer-shaped dry cell 49 whose negative terminal is constituted by the bottom metallic wall of the cell and abuts the frame 10 of the watch, whereby the frame is electrically connected thereto. The positive terminal 50 of cell 49 is in the form of a button centrally disposed on the top end thereof. Terminal 50 is engaged by a flexible contact finger 51 which is connected to one lead 52 of the magnet winding 40. The other lead 53 of winding 40 is connected to terminal 36 and hence to one end of helical spring 35.

Figure 4:
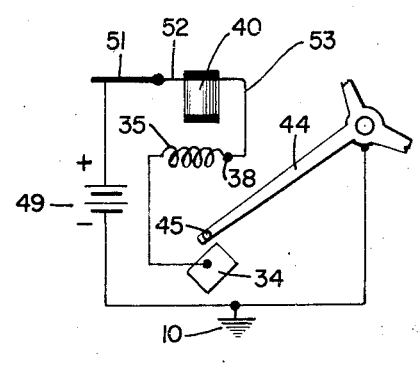
Fig. 4 is a schematic circuit diagram of the electrical system of the watch.

Thus, as best seen in Fig. 4, the electrical path from the positive terminal of the battery 49 to one terminal of relay winding 40 is via finger 51 and lead 52. The return path from the other terminal of the winding to the negative side of the battery is via lead 53 in series with spring 35, contact plate 34, branch 44 and the watch frame 10. The circuit to the electromagnet is completed only when contact pin 45 engages contact plate 34.

Operation of the watch

Let us assume at the outset that the magnet is unenergized and armature 42 lies against stop 48; in which event contact plate 34 is spaced a short distance to the right of contact 45 so that the contacts are disengaged.

Under these conditions the helical spring 35, acting upon the driving element 27, will drive said element in a clockwise direction, thereby compelling the click 32 to urge driving wheel 15 in the same direction. As a consequence, the train of wheels will be set in motion to drive the escape wheel 13 and thereby set the balance wheel 11 into oscillation in the usual manner. As the balance continues to oscillate, driving wheel 15 and the driving element 27 will turn slowly in the clockwise direction until a point is reached at which contact plate 34 comes into engagement with contact pin 45, thereby completing the electrical circuit of the electromagnet to energize same.

Energization of the magnet will sharply attract armature 42 to core 41 and cause contact pin 45 to subject contact plate 34 to a sudden pushing force, thereby effecting rotation of the driving element 27 in the counterclockwise direction against the action of the helical spring 35. When the driving element turns in the counterclockwise direction, click 32 picks up one or more teeth of the driving wheel 15.

It is important to note that the armature 42 is pulled up very smartly by the magnet when the voltage is supplied thereto, the movement of the armature being arrested abruptly when it impinges on the face of the core. The driving element 27, however, by reason of its inertia does not come to a halt when the armature is arrested, but continues to move a short angular distance in the counterclockwise direction against the tension of the helical spring. The continued movement of the driving element carries contact plate 34 away from contact pin 45. As a result, contact is broken between contact plate 34 and contact pin 45, thereby deenergizing the magnet 40 so that armature 42 is immediately retracted to stop 48 by flat spring 47. Helical spring 35, which has been expanded or wound up by the counterclockwise movement of the driving element, proceeds again to pull the driving element in the clockwise direction, thus driving the escapement and balance for a further period until another winding operation is initiated by re-engagement of the contact plate 34 with contact pin 45.

It is also important to observe that when the driving element is pushed in the counterclockwise direction by the armature branch 44, the click 32 slips over the teeth of the driving wheel 15. The wheel 15 is unable to follow the driving element 27 in the counterclockwise direction for the wheel is geared to the escapement 12 through the train and cannot reverse more than the small amount of play allowed by the backlash in the gears. As there is no maintaining power to operate during the rewind, the driving of the escapement is momentarily interrupted for a few milli-seconds during the operation of the magnet. However, owing to the inertia of the gear train, this interruption produces no adverse effect. For the same reason, an anti-reversing pawl is not necessary to hold the gear train.

*The watch casing*

A casing is provided whereby the watch movement is shielded from the battery and wherein access is had independently to the battery without the need to expose the watch mechanism.

Figure 2:
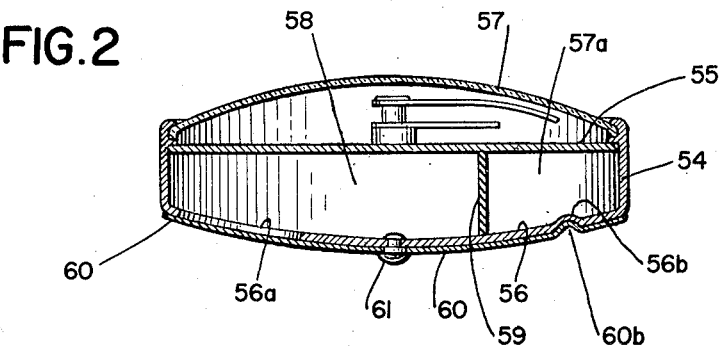
Fig. 2 is a cross-sectional view taken through the center of the watch-casing with the battery and watch movement omitted for reasons of clarity.
Figure 3:
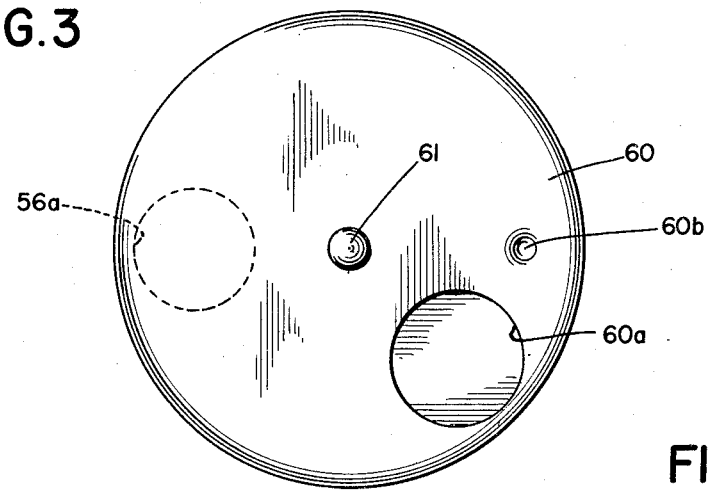
Fig. 3 is a plan view showing the back of the watch-casing.

As shown in Figs. 2 and 3, the casing for the electrically-driven watch comprises an annular shell 54, a dial plate 55 enclosing one end of the shell and a bottom wall 56 enclosing the other end thereof. Fitted above dial plate 55 is a transparent face member 57 of glass or plastic material. Separating the casing into a battery compartment 57a and a watch mechanism compartment 58 is a partition 59. Bottom wall 56 has a circular opening 56a therein to provide access to the battery compartment. A closure for the battery compartment is formed by a shutter plate 60 rotatably mounted on bottom wall 56 by means of a pivoting rivet 61. The closure has an opening 60a which registers with opening 56a in the bottom wall when the closure plate is shifted to a corresponding angular position.

To retain the closure plate in a position blocking access to the battery compartment, the bottom plate has a dimple 56b formed therein while shutter plate is provided with a complementary projection 60b which is received within the dimple when the shutter plate is at the corresponding angular position. Thus, the shutter plate is normally positioned to block the opening to the battery compartment; but when it is necessary to replace the battery, the shutter plate opening is rotated into alignment with the opening to the battery compartment. Inasmuch as the battery is isolated from the watch mechanism, leakage of the electrolyte or paste from the battery will not penetrate into the watch mechanism and the mechanism is secure from damage due to this cause. In inserting a new battery, one has but to lift the contact finger 51 and insert the cell thereunder.

While there has been shown what is considered to be a preferred embodiment of the invention, it is to be understood that many changes and modifications may be made therein without departing from the essential spirit of the invention. It is intended, therefore, in the annexed claims to cover all such changes and modifications as fall within the true spirit of the invention.

We claim:

1. A timepiece including a gear train having a driving wheel, a driving element for said wheel and which is reciprocative with forward driving and rearward recovery strokes, means for interconnecting said wheel and element so that said element rotatively drives said wheel forwardly during said driving strokes and permits said wheel to continue to rotate forwardly during said recovery strokes, spring means for forcing said element to move through its driving strokes and thus forwardly powering said train and for receiving and storing force during said recovery strokes, said train having enough inertia to retain its forward rotative rate substantially unchanged for short time intervals following the terminations of said driving strokes, and powered means for applying force to move said element through said recovery strokes substantially completely during said time intervals as to thereby store the force of said powered means in said spring means without incidental substantial changes in the forward rotative rate of said gear train.

2. A timepiece including a gear train having a driving wheel, a driving element for said wheel and which is reciprocative with forward driving and rearward recovery strokes, means for interconnecting said wheel and element so that said element rotatively drives said wheel forwardly during said driving strokes and permits said wheel to continue to rotate forwardly during said recovery strokes, spring means for forcing said element to move through its driving strokes and thus forwardly powering said train and for receiving and storing force during said recovery strokes, said train having enough inertia to retain its forward rotative rate substantially unchanged for short time intervals following the terminations of said driving strokes, and powered means for applying force to move said element through said recovery strokes substantially completely during said time intervals so as to thereby store the force of said powered means in said spring means without incidental substantial changes in the forward rotative rate of said gear train; said gear train having a rotative speed rate controlling means connected thereto and which is independent with respect to said driving element.

3. A timepiece including a gear train having a driving wheel, a driving element for said wheel and which is reciprocative with forward driving and rearward recovery strokes, means for interconnecting said wheel and element so that said element rotatively drives said wheel forwardly during said driving strokes and permits said wheel to continue to rotate forwardly during said recovery strokes, spring means for forcing said element to move through its driving strokes and thus forwardly powering said train and for receiving and storing force during said recovery strokes, said train having enough inertia to retain its forward rotative rate substantially unchanged for short time intervals following the terminations of said driving strokes, and powered means for applying force to move said element through said recovery strokes substantially completely during said time intervals so as to thereby store the force of said powered means in said spring means without incidental substantial changes in the forward rotative rate of said gear train; said powered means including an electromagnet having an armature connected to said element to move it for said recovery strokes when said electromagnet is energized, a battery for energizing said electromagnet, and a circuit connecting said battery to said electromagnet and including a circuit maker and breaker connected to close at the terminations of said driving strokes and to open not later than the terminations of said recovery strokes.

4. A timepiece including a gear train having a driving wheel, a driving element for said wheel and which is reciprocative with forward driving and rearward recovery strokes, means for interconnecting said wheel and element so that said element rotatively drives said wheel forwardly during said driving strokes and permits said wheel to continue to rotate forwardly during said recovery strokes, spring means for forcing said element to move through its driving strokes and thus forwardly powering said train and for receiving and storing force during said recovery strokes, said train having enough inertia to retain its forward rotative rate substantially unchanged for short time intervals following the terminations of said driving strokes, and powered means for applying force to move said element through said recovery strokes substantially completely during said time intervals so as to thereby store the force of said powered means in said spring means without incidental substantial changes in the forward rotative rate of said gear train; said powered means including an electromagnet having an armature connected to said element to move it for said recovery strokes when said electromagnet is energized, a battery for energizing said elecromagnet, and a circuit connecting said battery to said electromagnet and including a circuit maker and breaker connected to close at the terminations of said driving strokes and to open not later than the terminations of said recovery strokes, said gear train having a rotative speed rate controlling means connected therewith, said circuit maker and breaker being connected to and actuated by said driving element and being free from any direct connection with said rate controlling means.

5. A timepiece including a gear train having a driving wheel, a driving element for said wheel and which is reciprocative with forward driving and rearward recovery strokes, means for interconnecting said wheel and element so that said element rotatively drives said wheel forwardly during said driving strokes and permits said wheel to continue to rotate forwardly during said recovery strokes, spring means for forcing said element to move through its driving strokes and thus forwardly powering said train and for receiving and storing force during said recovery strokes, said train having enough inertia to retain its forward rotative rate substantially unchanged for short time intervals following the terminations of said driving strokes, and powered means for applying force to move said element through said recovery strokes substantially completely during said time intervals so as to thereby store the force of said powered means in said spring means without incidental substantial changes in the forward rotative rate of said gear train; said powered means having a controller terminating its applications of force to said element prior to the latter reaching its recovery stroke terminations and said element having freedom to continue moving to its recovery stroke terminations, said element having enough inertia with respect to the force of its said spring means and its moving speed imparted to it by the force of said powered means, to continue its movements to said recovery stroke terminations after the terminations of force by said powered means.

6. A timepiece including a gear train having a driving wheel, a driving element for said wheel and which is reciprocative with forward driving and rearward recovery strokes, means for interconnecting said wheel and element so that said element rotatatively drives said wheel forwardly during said driving strokes and permits said wheel to continue to rotate forwardly during said recovery strokes, spring means for forcing said element to move through its driving strokes and thus forwardly powering said train and for receiving and storing force during said recovery strokes, said train having enough inertia to retain its forward rotative rate substantially unchanged for short time intervals following the terminations of said driving strokes, and powered means for applying force to move said element through said recovery strokes substantially completely during said time intervals so as to thereby store the force of said powered means in said spring means without incidental substantial changes in the forward rotative rate of said gear train; said powered means including an electromagnet having an armature connected to said element to move it for said recovery strokes when said electromagnet is energized, a battery for energizing said electromagnet, and a circuit connecting said battery to said electromagnet and including a circuit maker and breaker connected to close at the terminations of said driving strokes and to open not later than the terminations of said recovery strokes, said circuit maker and breaker opening prior to said recovery stroke terminations and said element having freedom to continue moving to its said recovery stroke terminations, said element having enough inertia with respect to the force of its said spring means and its moving speed imparted to it by said armature, to continue its movements to its recovery stroke terminations.

7. A timepiece including a gear train having a driving wheel, a driving element for said wheel and which is reciprocative with forward driving and rearward recovery strokes, means for interconnecting said wheel and element so that said element rotatively drives said wheel forwardly during said driving strokes and permits said wheel to continue to rotate forwardly during said recovery strokes, spring means for forcing said element to move through its driving strokes and thus forwardly powering said train and for receiving and storing force during said recovery strokes, said train having enough inertia to retain its forward rotative rate substantially unchanged for short time intervals following the terminations of said driving strokes, and powered means for applying force to move said element through said recovery strokes substantially completely during said time intervals so as to thereby store the force of said powered means in said spring means without incidental substantial changes in the forward rotative rate of said gear train; said powered means including an electromagnet having an armature connected to said element to move it for said recovery strokes when said electromagnet is energized, a battery for energizing said electromagnet, and a circuit connecting said battery to said electromagnet and including a circuit maker and breaker connected to close at the terminations of said driving strokes and to open not later than the terminations of said recovery strokes, said gear train having a rotative speed rate controlling means connected therewith, said circuit maker and breaker being connected to and actuated by said driving element and being free from any direct connection with said rate controlling means, said circuit maker and breaker opening prior to said recovery stroke terminations and said element having freedom to continue moving to its said recovery stroke terminations, said element having enough inertia with respect to the force of its said spring means and its moving speed imparted to it by said armature, to continue its movements to its recovery stroke terminations.

References Cited in the file of this patent
UNITED STATES PATENTS

| 1,797,648 | Geisslinger | Mar. 24, 1931 |
| 1,821,897 | Porter | Sept. 1, 1931 |

FOREIGN PATENTS

| 151,710 | Germany | May 30, 1904 |
| 195,383 | Switzerland | Apr. 16, 1938 |